(12) United States Patent
Staedele et al.

(10) Patent No.: US 10,160,269 B2
(45) Date of Patent: Dec. 25, 2018

(54) VEHICLE AIR SUPPLY SYSTEM

(71) Applicant: AGCO INTERNATIONAL GMBH, Hesston, KS (US)

(72) Inventors: Alexander Staedele, Landsberg am Lech (DE); Christian Pischulti, Kaufbeuren (DE)

(73) Assignee: AGCO International GmbH, Neuhausen (CH)

( * ) Notice: Subject to any disclaimer, the term of this patent is extended or adjusted under 35 U.S.C. 154(b) by 112 days.

(21) Appl. No.: 15/293,959

(22) Filed: Oct. 14, 2016

(65) Prior Publication Data
US 2017/0120695 A1 May 4, 2017

(30) Foreign Application Priority Data

Nov. 3, 2015 (GB) .................................. 1519411.1

(51) Int. Cl.
*B60C 23/00* (2006.01)
*B60C 23/04* (2006.01)

(52) U.S. Cl.
CPC ........ *B60C 23/003* (2013.01); *B60C 23/0484* (2013.01); *B60C 2200/08* (2013.01)

(58) Field of Classification Search
CPC ... B60C 23/00; B60C 23/003; B60C 23/0484; B60C 2200/08
USPC .................................. 152/415, 416, 417, 418
See application file for complete search history.

(56) References Cited

U.S. PATENT DOCUMENTS

| 4,754,792 A * | 7/1988 | Braun ................... | B60C 23/003 137/224 |
|---|---|---|---|
| 6,098,682 A * | 8/2000 | Kis ....................... | B60C 23/003 137/224 |
| 6,726,189 B2 | 4/2004 | Folchert et al. | |
| 6,824,145 B2 * | 11/2004 | Behmenburg .......... | B60C 23/10 152/416 |
| 2004/0055291 A1* | 3/2004 | Meydieu ............... | B60C 23/003 60/468 |

(Continued)

FOREIGN PATENT DOCUMENTS

| DE | 10 2008 062075 A1 | 6/2010 |
|---|---|---|
| DE | 20 2013 102769 U1 | 7/2013 |

(Continued)

OTHER PUBLICATIONS

European Patent Office, International Search Report for related European Application No. EP16 19 2368, dated Mar 23, 2017.

(Continued)

*Primary Examiner* — S. Joseph Morano
*Assistant Examiner* — Jean W Charleston

(57) ABSTRACT

An air supply system on a vehicle having a tire. The system includes a compressor having a supply mode for supplying air to a consumer connected to the compressor. The consumer is provided with a reservoir and the compressor switches to an idle mode when the pressure of the reservoir attains a first predetermined reservoir pressure. During a supply period when the consumer is supplied with air from the compressor, the pressure of at least one tire is measured and prior to a subsequent tire pressure measurement, air is discharged from the reservoir so that the compressor remains in the supply mode and the consumer and/or reservoir continues to be supplied with air.

10 Claims, 2 Drawing Sheets

(56) References Cited

U.S. PATENT DOCUMENTS

2007/0214963 A1  9/2007  Hoffman
2008/0251177 A1* 10/2008  Sandoni ................ B60C 23/003
                                            152/416

FOREIGN PATENT DOCUMENTS

| EP | 10193068 A2 | 7/2011 |
| GB | 2476263 A | 6/2011 |
| GB | 201513660 | 2/2017 |
| WO | 2004/005100 A | 1/2004 |

OTHER PUBLICATIONS

Intellectual Property Office, International Search Report for Priority Application No. GB1519411.1, dated May 9, 2016.

* cited by examiner

VEHICLE AIR SUPPLY SYSTEM

BACKGROUND

Field of Invention

This invention relates to an air supply system and in particular to an air supply system for supplying pressurized air from a compressor to operate a range of functions on a tractor such as a tiliterre pressure control system (TPCS).

Description of Related Art

The tire pressure on a tractor is often adjusted by a TPCS when moving between a field and a road to improve the tractor's efficiency and to reduce the pressure on the field which in turn reduces soil compaction and damage to crops.

A typical air supply system on a tractor therefore supplies air from the compressor to a primary consumer (such as the tractor's braking system) via an air dryer and also to a secondary consumer such as a TPCS which may be supplied via a dryer or directly to the tire. Some on board air consumers may be provided with a respective reservoir. It is desired that the adjustment of the pressure of the tires is done as quickly possible to save time when moving between a field and a road. This also includes the tires of attached trailers which may be connected to the air supply system and the TPCS of the tractor.

To save energy, an air compressor is switched to an idle mode when the consumer air reservoirs reach a predetermined pressure level. In an idle mode the air flow is discharged to the atmosphere so that the input power of the compressor is reduced, thus increasing efficiency. When the pressure in a consumer air reservoir falls below the predetermined level the compressor is switched to the normal supply mode.

When inflating the tires, the air compressor must constantly supply air as the volume of a reservoir associated with a tire is relatively small compared to the volume of the tire. As a consequence, the air stored in the reservoir would not be sufficient to inflate the tire without the compressor running. For example, a rear tire may have an interior volume of up to 1600 liters, whereas the reservoir can only store 160 liters. This results in that during inflation, the compressor is not likely to be switched into an idle mode.

Pressure measurements are typically conducted several times during inflation/deflation processes. The time taken to measure the pressure of each tire can take several seconds. During pressure measurements, a small volume of air from the compressor is needed to activate pilot valves to connect the compressor to a tire valve. During a tire pressure measurement, as a consequence of this air consumption, the predetermined pressure level in a reservoir results in the compressor being switched into an idle mode. This is the case even if the desired pressure of the tire has not been reached. Thus, after each pressure measurement, the compressor must then be switched back from the idle mode to the normal supply mode, if the tire is to be pressurized again. This extends the length of time needed to deflate and inflate the tire, as each measurement switches the compressor into an idle mode.

BRIEF SUMMARY OF THE INVENTION

It is an aim of the invention to minimize the time taken to inflate tires connected to an air supply system and the TPCS of a tractor. It is a further aim of the invention to increase the operation time of a compressor of an air supply system and to avoid the activation of an idle mode of the compressor during inflation of a tire.

One aspect of the invention is an air supply system on a vehicle having at least one tire, the system including a compressor having a supply mode for supplying air to a consumer connected to the compressor, wherein the consumer is provided with a reservoir and wherein the compressor switches to an idle mode when the pressure of the reservoir attains a first predetermined reservoir pressure, and wherein during a supply period when the consumer is supplied with air from the compressor the pressure of the at least one tire is measured and prior to a subsequent tire pressure measurement, air is discharged from the reservoir so that the compressor remains in the supply mode and the consumer and/or reservoir continues to be supplied with air.

In this way, activation of an idle mode of the compressor during inflation of a tire is avoided and thus the overall time taken to inflate a tire is minimized.

The consumer may also be a tire.

Preferably, air is discharged from the reservoir at a predetermined time which is dependent on the time taken to measure the pressure of the at least one tire and the time taken to supply the reservoir to its capacity.

Knowing the time taken to fill the reservoir and the time taken to measure the pressure of a tire, a vehicle control unit can activate the discharge of air from the reservoir.

The predetermined time is preferably less than the time taken to supply air to the reservoir to its capacity and greater than the time taken to measure the pressure of the at least one tire.

Air may be discharged from the reservoir when a second predetermined reservoir pressure is reached, the second predetermined reservoir pressure being less that the first predetermined pressure. The discharge may therefore be pressure-controlled depending on the reservoir pressure as determined by pressure sensors.

Air is preferably discharged from the reservoir when a tire pressure measurement of the at least one tire is complete. The discharge may thus be controlled by another event.

After the pressure of at least one tire is measured, air is preferably discharged from the reservoir to a second tire. This reduces the amount of air wasted.

Preferably, a pressure measurement of a first tire is made and air is then discharged from the reservoir to the first or second tire.

More preferably, air is discharged from the reservoir to a further consumer on the vehicle not being a tire.

Air may be discharged from the reservoir to the atmosphere.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The invention will now be described, by example only, with reference to the following drawings in which.

DETAILED DESCRIPTION OF EXEMPLARY EMBODIMENTS

Figure 1:
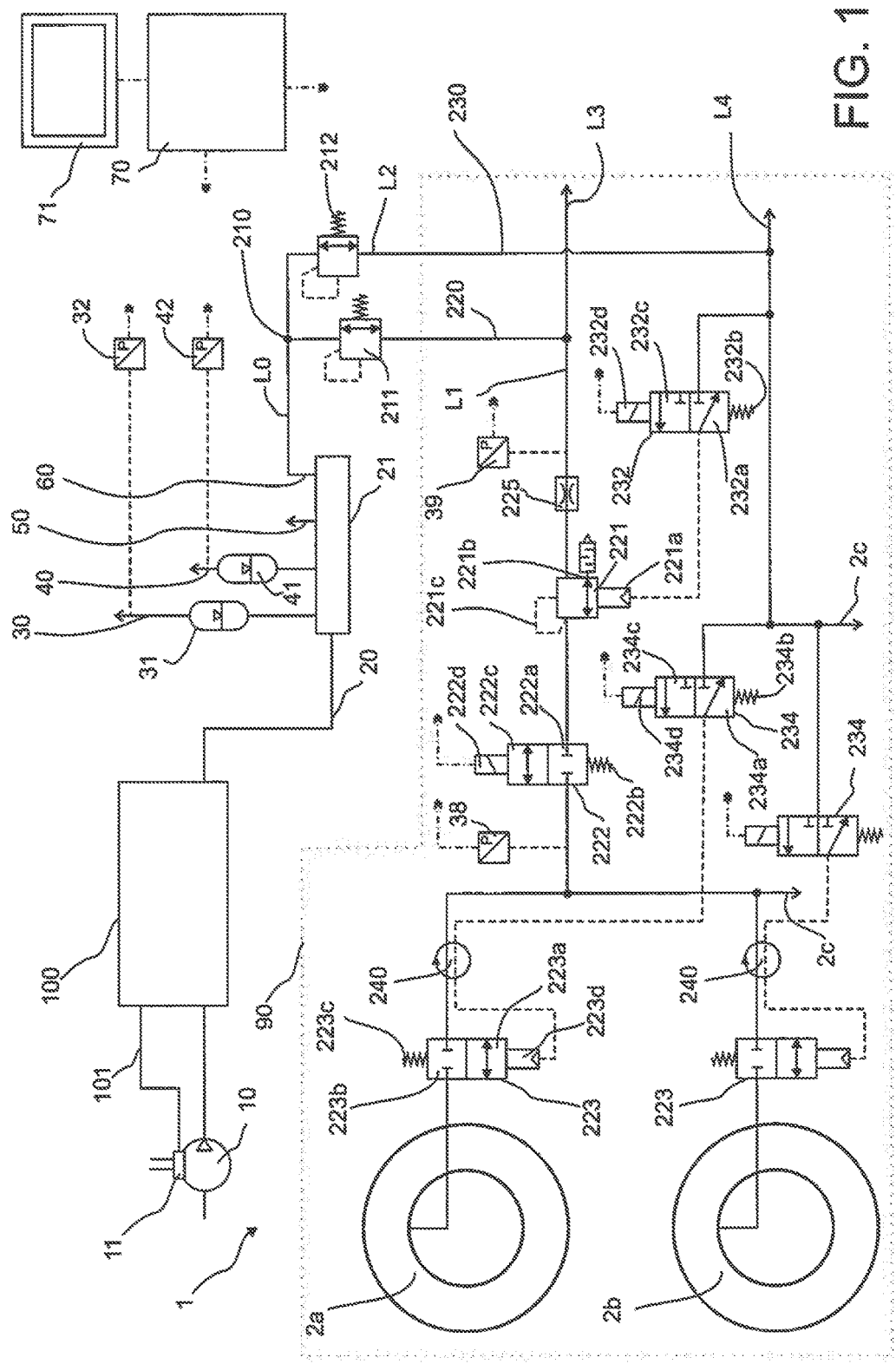
FIG. 1 is a circuit diagram of a tractor air supply system connected to a TPCS in accordance with the invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

The details of the TPCS do not form part of the present invention, so the following example is given as one possible embodiment of a TPCS, and it will be understood that any suitable form of TPCS can be used for allowing quick and efficient adjustment of the pressure within the tires.

FIG. 1 shows a circuit diagram of a Tractor Pressure Control System (TPCS) 90 and an air dryer 100 on a tractor 1 having two tires 2a, 2b. Tires 2a, 2b are connected to the TPCS for inflation and deflation. For the avoidance of doubt, the term deflation means that air is let out of the tire. Furthermore, the term inflation means that air is supplied into the tire.

A compressor 10 supplies air to components on a vehicle via the air dryer 100. The air dryer 100 is connected to various consumers 30, 40, 50, 60 via a consumer branch 20 and protection valve means 21. Air reservoirs 31, 41 are assigned to consumers 30, 40 and are equipped with pressure sensors 32, 42 to measure their pressures. Consumers 50 or 60 may also be equipped with respective reservoirs or sensors. Generally, the reservoirs are kept within a defined pressure range, for example, 7 to 8.5 bar to ensure that they can deliver the required air pressure to a consumer when required, for example during braking.

Protection valve means 21 balances the pressure required to be supplied to the primary set of consumers 30, 40 and the secondary consumers 50, 60 and will cut the supply to any consumer should a consumer develop a leak. In this way, the integrity of the remaining (primary) consumers is maintained. Furthermore, protection valve means 21 ensures that supply to primary consumers is prioritised over the supply to secondary consumers, such as the TPCS. In tractors or trucks, primary consumers 30 and 40 may be parallel brake circuits for a dual-circuit service brake. Secondary consumers 50, 60 may be a parking brake, an air suspension of the cab and wheels, or, as shown in FIG. 1, the TPCS 90.

Vehicle air supply systems for supplying on board consumers are described, as for example in applicant's published patent application No. EP10193068.

The components of the TPCS 90 are explained in detail:
Generally, the TPCS 90 comprises two separate circuits which represent two functions of the system.

One circuit is the supply circuit 220 which is branched off the main TPCS line L0 at connection 210 and connects supply line L1 to tires 2a, 2b for supplying air thereto. Supply circuit 220 must be capable of high air flow rates at high pressures to ensure fast inflation of a tire.

A second circuit, control circuit 230 is also branched off from the main TPCS line L0 at connection 210 and connects with pilot control line L2. The control circuit 230 activates the deflation and inflation process by using components of the supply circuit 220.

Control circuit 230 mainly comprises pilot valves which for clarity are partly omitted in FIG. 1. Various pilot valve configurations may be used, as for example, those shown in PCT/EP2014/065935. In FIG. 1 the pilot control valves 232 and 234 are provided for pneumatically controlling main control valve 221 and second stop valve 223 of the supply circuit 220. All components of the control circuit 230 have low air flow specifications as the pilot function requires only low air flows. The lower pressures and air flow in control circuit 230 enables the use of smaller and cheaper components, especially valves, which improves procurement costs and installation space. Furthermore, the use of low pressures enables greater accuracy when sensors are installed, as the accuracy is decreased by a greater range of operation.

To maintain the different pressure levels in both circuits 220, 230 excess flow valves 211, 212 are provided. If the pressure level exceeds the set level in the TPCS circuit, the connection is blocked to protect the components of the TPCS. For example, excess flow valve 211, assigned to supply circuit 220 may be set to a maximum pressure between 7.1 to 7.5 bar, hereinafter referred to as the supply pressure. Excess flow valve 212, assigned to pilot control circuit 230 may be set to a maximum pressure between 4.5 to 5 bar, hereinafter referred to as the pilot control pressure.

The supply circuit 220 is provided with a main control valve 221 to regulate the pressure in the tires 2a, 2b. The main control valve 221 is controlled by pilot valve 232. Port 221a is connected to pilot control valve 232 which has two operating conditions for providing pilot control. Pilot control valve 232 is biased into a closed position 232a by a spring means 232b and can be moved to an open position 232c to allow air flow. In the closed position 232a, port 221a is connected to the atmosphere. The valve 232 may be moved into the open position 232c against the force of the spring 232b by energising solenoid 232d which is electrically connected to control unit 70 which in turn is connected to a display screen 71. For clarity reasons, the electric connections to the control unit 70 are only indicated by a double arrow.

Main control valve 221 has two operating conditions:
In a first condition, the tire 2a is connected to the air supply via main TPCS line L0 and supply line L1 for inflation. In a second condition (shown in FIG. 1) the tire of wheel 2a is connected to the atmosphere via port 221b for deflation. With respect to the inflation operation, main control valve 221 is provided with a feedback via line 221c which ensures that the pressure level in the supply circuit 220 after the main control valve 221 does not exceed 4.5-5 bar as the pressure in line 221c counteracts the pressure of the control circuit 230 via valve 232 which is set to a maximum of 4.5-5 bar. This balance ensures that the tires are not charged with more than 5 bar which represents an acceptable level. The higher pressure in the supply circuit 220 prior to main control valve 221 increases the performance of the TPCS. The pressure in the supply circuit 220 is adjusted to a maximum of 7.5 bar by excess flow valve 211.

A first stop valve 222 is positioned between the main stop valve 221 and the tires 2a, 2b to allow inflation and deflation of the tire. First stop valve 222 is biased into closed position 222a by a spring means 222b and can be moved to an open position 222c to allow air flow. The valve 222 may be moved into the open position 222c against the force of the spring 222b by energising solenoid 222d electrically connected to control unit 70. Supply line L1 branches into separate tire supply lines between valve 222 and each tire 2a, 2b. Each tire supply line passes through a rotatable passage 240 to connect each tire supply line to the supply line L1.

With reference to FIG. 1, tires 2a and 2b are supplied and controlled by similar components and therefore the same numerals are used for same components which are common to both tires 2a, 2b. Supply line L1 is static relative to a second stop valve 223 located on the wheel. Second stop valve 223 is controlled pneumatically and can be moved into two positions, open position 223a and closed position 223b biased by spring means 223c. Valve 223 is operated by charging port 223d via the control circuit 230. By charging port 223d, valve 223 can be moved against the spring 223c into an open position 223a to connect the tire to the supply line L1. Port 223d is connected to pilot control valve 234 by a line passing through rotatable passage 240. Pilot control valve 234 has two operating conditions for providing pilot control. Pilot control valve 234 is biased into closed position 234a by a spring means 234b and can be moved to an open position 234c to allow air flow. In the closed position 234a, port 223d is connected to the atmosphere. The valve 234 may be moved into the open position 234c against the force of the spring 234b by energising solenoid 234d which is electrically connected to control unit 70.

During operation of the tractor and when the TPCS is in a stand-by mode, second stop valve 223 is in a closed position to close the tire volume.

Referring to TPCS the term stand-by mode is defined herein as meaning that the TPCS is in a condition wherein no change in tire pressure is done by the driver or an automatic control system but measurements or monitoring functions may still function. The TPCS Active mode is characterised by any change in tire pressure.

The term operation of the vehicle or machine is defined herein as meaning that the vehicle or machine is in a condition in which its system or systems are sufficiently powered to for operation, for example, with the engine running. The term shut down of the vehicle is defined herein as meaning that the tractor is in a condition in which its system or systems are not sufficiently powered for operation, for example when the ignition key is removed and the driver leaves the tractor.

If the vehicle is not in operation (shut down), the TPCS is also out of operation as supply of any electric or pneumatic energy supply is cut. Consequently, in this condition the TPCS is not in stand-by, nor in Active mode.

If the tire pressure is adjusted (by manual input by the driver or an automatic control system), first and second stop valve 222, 223 are moved to their open positions 222a and 223a. Adjusting the tire pressure thereby means that the TPCS is inflating or deflating at least one tire until the desired pressure for the respective tire is reached.

If the tires are inflated (tire pressure is increased), main control valve 221 is adjusted so that the tires are connected to the main TPCS line L0 and each tire is charged with air. Depending on the design, the pressure adjustment may be done in two ways. Main control valve 221 is fully opened until the tire pressure, monitored by first pressure sensor 38 reaches the demanded value. Alternatively, main control valve 221 is opened to a position corresponding to the required pressure and closes when the value is reached.

In case of deflation, main control valve 221 may be moved into a position in which the valve 221 is connected with the atmosphere at port 221b and air is discharged until the demanded pressure value, monitored by first pressure sensor 38 is reached.

At the end of any inflation or deflation process, second stop valve 223 is moved to a closed position.

Before measuring the current tire pressure of tire 2a, the system initiates a preliminary procedure to increase functional safety. A seal between the rotary passage and the supply line is checked. First second stop valve 223 is closed while second stop valve 222 is opened. The seals of rotary passage 240 are then pressurized by main control valve 221 to ensure a proper seal.

The measurement is then started by opening the second stop valve 223 so that air from tire 2a flows from the tire along supply line L1 to first stop valve 222. If the opening and closing of the second stop valve 223 is controlled by a tractor control unit 70, the second stop valve 223 can be opened automatically for a defined period of time before closing to achieve a static pressure in the respective supply line. The pressure in the supply line between the tire and the first stop control valve 222 can be measured by pressure sensor 38 which represents the pressure in the tire.

The restriction 225 is used to determine the pressure differential. The pressure sensor 38 thereby provides the pressure in the supply line between the restriction 225 and main control valve 221 while a second pressure sensor 39 measures the pressure of the other side of the restriction 225. Both sensors are used to calculate the pressure differential Δp across the restriction 225. By calculating the pressure differential Δp, the air flow rate Q of the air being supplied to the tire can be calculated. As this function is not relevant for the invention, reference is taken to applicant's pending application GB1513660.9.

The TPCS 90 is only shown for one axle in FIG. 1. A second axle has a symmetrical circuit (not shown) which is connected to supply circuit 220 via line L3 and to a control circuit via line L4. Additional tires (not shown) may be connected parallel to tires 2a and 2b, as indicated by arrows 2c. Additional tires would be provided with respective second stop valves 223 and a pilot control valve 234. Tires 2a and 2b may also represent twin tires assembled on one side of an axle. Furthermore, the TPCS may also include tires on a trailer or on a towed implement.

Details of the air supply, especially the function of compressor 10 and the consumer branch 20 are now explained.

Compressor 10 during normal operation supplies air to consumers and is said to be in a supply mode. Compressor 10 is equipped with idler means 11 to provide an idle mode in which the air flow is discharged to the atmosphere. Alternatively, this efficiency function may be controlled by an OFF/ON clutch which cuts the mechanical drive of compressor 10. Furthermore, the compressor 10 may be electrically driven and the electric supply may be switched off by idler means 11.

To switch the compressor 10 into the idle mode, air dryer 100 is connected to idle means 11 via idle control line 101.

The relevant operating modes of the air dryer 100 are now explained, whereby modes for regeneration or overpressure protection are not explained as they are not relevant for the present invention.

Loading Mode

When a consumer requires air, air from compressor 10 flows to the consumer branch 20 via dryer 100. The pressure in the consumer branch is monitored by sensors 32, 42 which are assigned to reservoirs 31, 41 respectively.

Idle Mode

If the consumer branch 20 is provided with sufficient air flow, the pressure is about 8.5 bar. If this pressure level, referred to as the idle pressure level, is exceeded because compressor 10 is still working, the air dryer 100 switches the compressor into the idle mode by pressurizing idle control line 101 and the air flow is discharged to the atmosphere. This function is well known in the art so that the internal pneumatic scheme of air dryer 100 is not explained in detail.

The compressor 10 is switched back from the idle mode to the supply mode if the pressure in the reservoir drops below 7 bar, referred to as the supply pressure level. This supply level is the minimum acceptable level during operation to ensure that the brakes, for example, work properly. Therefore, in normal operation, the reservoir pressure will vary between 7 and 8.5 bar. The pressure should only drop below said range during shut down of the tractor.

Problems arise when the consumer is the TPCS and the tires require inflation. Various pressure measurements of the tire are made as the tire is being inflated. The pressure measurements must be conducted when the tire is not being inflated or deflated, otherwise a dynamic pressure is measured which differs from a static pressure of the tire. During measurement of the tire with the low air consumption, the pressure in the reservoir reaches a predetermined idle pressure level so that the compressor is switched into an idle mode. This is the case even if the desired pressure in the tire is not reached. As a result, after each pressure measurement, the compressor must then be switched from the idle mode to a normal supply mode if the tire is to be inflated to the desired pressure.

In accordance with the invention, air from the reservoir is discharged after each pressure measurement is made. The air may be discharged to the atmosphere, or to other consumers such as the suspension, or trailer brakes, or another tire. In this way the pressure in the reservoir is reduced so that during tire pressure measurement the pressure in the reservoir does not exceed the idle pressure level and thus the compressor remains in a supply mode and is not switched to the idle mode. The term for the procedure to discharge air from the reservoir to the atmosphere, or to other consumers is referred to as an intermediate discharge.

Preferably, the air from the reservoir is discharged to a tire for efficiency reasons. The tires may be on the same axle, or may belong to a different axle or may be provided on a trailer/implement.

Generally the volumes of the tires are much greater than the volume of the respective reservoirs (for example, the volume of a tire reservoir may be 160 liters, whereas the volume of tire may be 1600 liters) so that the compressor is likely to be constantly supplying air during inflation without reaching the idle pressure level. If the pressure of a first tire 2a is measured, the air consumption drops to a very low level so that the pressure level in the reservoir rapidly increases to reach the idle pressure level. But before this idle pressure level is reached, the reservoir is discharged by an intermediate filling of a second tire. Alternatively, the reservoir may be discharged by an intermediate filling into the first tire which was measured beforehand. The term intermediate filling therefore means that a small volume of air is discharged from the reservoir to the tire and thus has a negligible effect on the pressure of the tire. This is different to the step of inflation or deflation. Due to the comparatively large volume of the tire, the intermediate filling results in a reasonable reduction of the pressure of the reservoir. A pressure measurement of the tire of a second tire 2b is then made whereby the pressure level in the reservoir is raised again. Prior to reaching the idle pressure level, the inflation step is started by pneumatically connecting the first and second tire to the compressor. Alternatively, if a tire pressure measurement is necessary, a further intermediate filling is started.

The intermediate filling must always be followed by a tire pressure measurement.

The activation of the intermediate filling is generally provided by control unit 70 and may be time-controlled. The time control requires knowledge of some operational parameters:

The time taken by the compressor to raise the pressure in the reservoir from the supply pressure level (7 bar) to the idle pressure level (8.5 bar). This is referred to as the reservoir filling time.

The time taken by the TPCS to record the pressure measurement of one or more tires. This is referred to as the measurement time. The measurement time is quite long, since prior to each pressure measurement, the seals in rotatable passage 240 are pressurized to ensure that there is a proper seal and checks are made, as explained previously.

The intermediate filling activation time or more generally the intermediate discharge activation time, which is the time between the start of a tire pressure measurement and the activation of the intermediate filling or discharge to the atmosphere, or to other consumers, has to meet two requirements:

1. First, the intermediate filling activation time or the intermediate discharge activation time must be less than the reservoir filling time. If not, the compressor switches to the idle mode before intermediate filling is started and would then require the compressor to be brought back to the supply mode.
2. Second, the intermediate filling activation time or the intermediate discharge activation time must be greater than the pressure measurement time for one or more tires.

As an example, if the reservoir filling time is 7 seconds and the measurement time for one tire is about 5 seconds, the intermediate filling activation time or the intermediate discharge activation time may be 6 seconds so that the measurement is completed anyway and the compressor does not switch to the idle mode.

In another example, the vehicle is provided with larger reservoirs so that the reservoir filling time is 14 seconds while the measurement time for one tire is still about 5 seconds. In this case, the pressure of two tires can be measured in 10 seconds. The intermediate filling could therefore be started after two measurements. A third tire could not be measured as then the overall measurement time would be 15 seconds and the reservoir filling time of 14 seconds would be exceeded.

Knowing the reservoir filling time and the measurement time as described above, the control unit 70 can activate the intermediate filling after one, two or more measurements of these parameters.

Additionally or alternatively, the activation of the intermediate filling may be event-controlled depending on the termination of the pressure measurement of one or more tires.

Further, the activation of the intermediate filling may be pressure-controlled depending on the reservoir pressure as determined by pressure sensors 32, 42. Further still, the pressure may be measured by the protection valve 21 or the consumer branch 20.

Independent of the method of activation of the intermediate filling, a safety margin must be applied to ensure that the intermediate filling starts before the idle pressure is reached.

After starting the intermediate filing, the pressure in the reservoir is rapidly decreased until the reservoir reaches the supply pressure level of say 7 bar. The time taken for intermediate filing or more generally any discharge of air from the reservoir is referred to as discharge time.

The intermediate filling may result in that the first tire and second tire of an axle do not reach the desired pressure at the same time, as one tire is filled during intermediate filling while the other is not. However, since the valves on the air supply system are not symmetrical and the distances of the pressure source from each tire 2a, 2b are not the same, a difference in tire pressure of each tire on an axle exists when inflated.

The difference in tire pressure between the tires 2a, 2b may be balanced during normal inflation or deflation when both tires of an axle are pneumatically connected. If necessary the balance may be achieved by an extra inflation step for one tire only. More preferably a subsequent intermediate filling (as defined above) may be used to balance the tire with the lower pressure.

Figure 2:
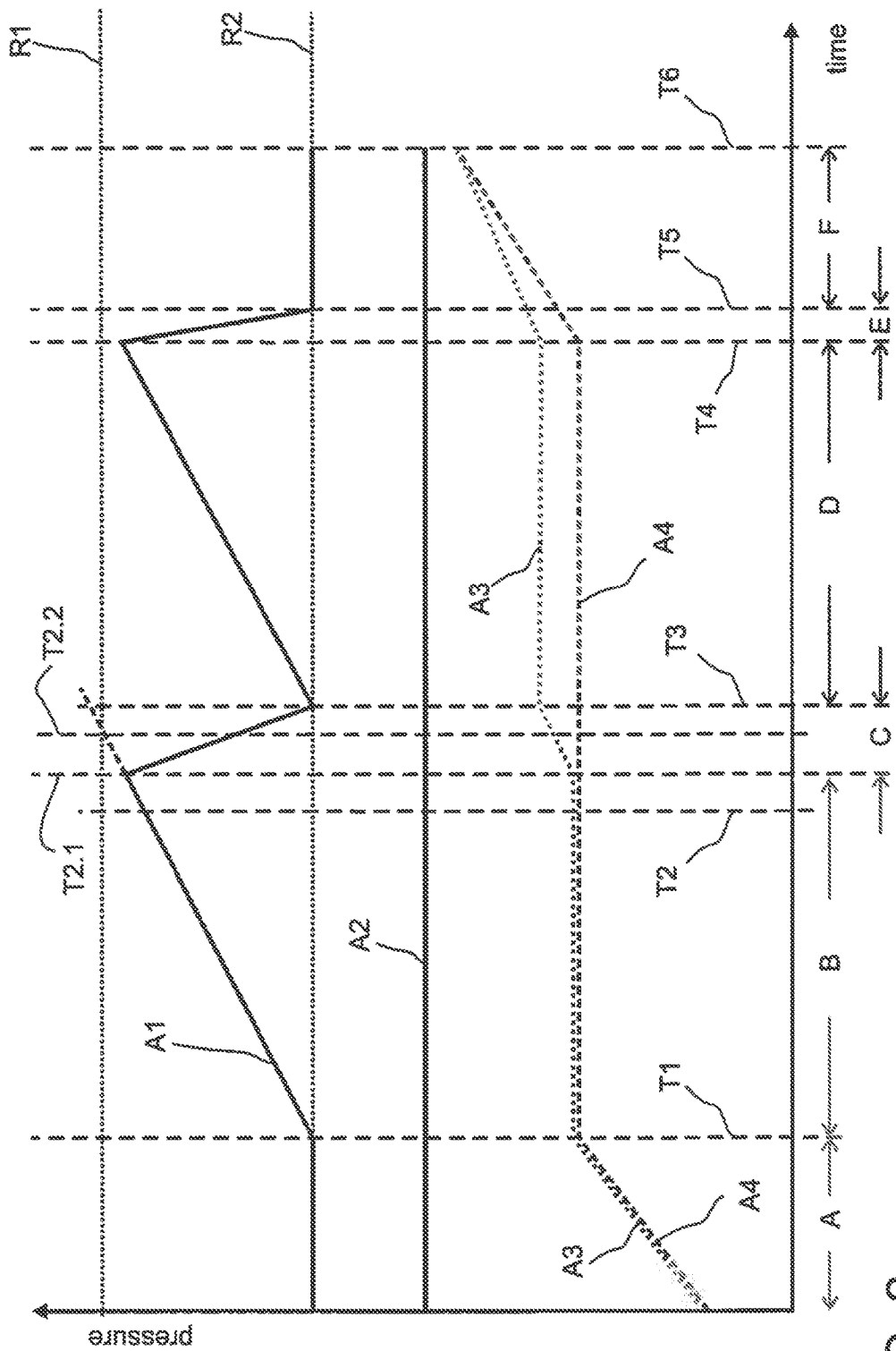
FIG. 2 is a graph showing the change in pressure of two consumers, a compressor and a consumer reservoir of a vehicle air supply system in accordance with the invention.

FIG. 2 is a graph showing the change in pressure of the reservoir, A1, the compressor air flow A2, the pressure of the left tire A3 and the pressure of the right tire A4 on the same axle with time in accordance with the invention. The graph also shows two reference lines R1, R2 indicating the pressure of the reservoir associated with the tires whereby:

R1 represents the idle pressure level, for example, 8.5 bar at which the compressor is switched to the idle mode, and R2 represents the supply pressure level of, for example, 7 bar at which the compressor is switched back to the supply mode.

So when the reservoir pressure exceeds pressure R1, the compressor is switched to the idle mode. Any air consumption would then result in a pressure drop. If pressure R2 is reached, the compressor would be switched to the supply mode.

During time interval A, compressor 10 is in the supply mode and is supplying air to the left and right tires A3, A4. As a result, the pressure in the tires increases, the compressor air flow A2 is constant and the pressure in the reservoir A1 is below the idle pressure level R1, since air is passing through the reservoir to the tires without increasing the pressure in the reservoir. At time T1, a pressure measurement of the first tire is made. As a result, over time interval B representing the intermediate filling activation time, the reservoir pressure A1 increases, the pressure in the tires A3, A4 remains constant (since air is not passing through to the tires during measurement) and the compressor air flow A2 remains constant. At time T2 the pressure measurement of the tire is complete. At time T2.1, in accordance with the invention, the intermediate filling is activated by a time-control so that air from the reservoir is released to prevent the reservoir reaching the idle pressure level R1. This is necessary since otherwise, under normal circumstances the compressor would switch to the idle mode upon reaching the idle pressure R1 at time T2.2. During time interval C representing the discharge time, air is discharged from the reservoir during intermediate filling so that a pressure drop in the reservoir A1 is observed. The air from the reservoir may be discharged to a consumer on the tractor, such as a tire, or the suspension system, or to the atmosphere. In FIG. 2, the air from the reservoir is discharged to the left tire so that a marginal increase in the pressure of this tire A3 occurs during interval C. The discharge time during interval C is very short, approximately 3 seconds. At time T3, at the end of the time interval C, the intermediate filling is stopped. The pressure in the left tire is slightly higher than in the right tire. During time interval D, the right tire pressure is measured which again results in an increase of the reservoir pressure A1 while the pressure in the tires A3, A4 remains constant.

At time T4, the inflation step is started by connecting both left and right tires to the reservoir and the compressor. This results in an immediate pressure drop in the reservoir during time interval E so that the compressor is not switched to the idle mode. During time interval F, the reservoir pressure remains below idle pressure level R1 so that the compressor works in the supply mode. Both tires are connected pneumatically, so that there is no pressure difference between the left and right tires so that at time T6, both tires should show the same tire pressure. If not, the diverging tire may be inflated separately to balance the tire pressures at the desired pressure.

Alternatively the intermediate filling or intermediate discharge may be activated at different times depending on the method activation.

If the activation is event controlled, the intermediate filling or intermediate discharge would be activated at T2 when the control unit 70 detects that tire pressure measurement of first tire is finished.

If the activation is pressure controlled, the activation intermediate filling or intermediate discharge would be activated at a predetermined pressure level close to the idle pressure level. With reference to FIG. 2, this predetermined pressure level may be below R1, so that the intermediate discharge is activated before time T2.2 is reached.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An air supply system on a vehicle having at least one tire, said system comprising a compressor having a supply mode for supplying air to a consumer connected to the compressor, wherein said consumer is provided with a reservoir and wherein the compressor switches to an idle mode when the pressure of the reservoir attains a first predetermined reservoir pressure, and wherein during a supply period when the consumer is supplied with air from the compressor, the pressure of the at least one tire is measured and prior to a subsequent tire pressure measurement, air is discharged from the reservoir so that the compressor remains in the supply mode and the consumer and/or reservoir continues to be supplied with air.

2. The air supply system as claimed in claim 1 wherein air is discharged from the reservoir at a predetermined time which is dependent on a time taken to measure the pressure of the at least one tire and a time taken to supply air to the reservoir to its capacity.

3. The air supply system as claimed in claim 2 wherein the predetermined time is less than the time taken to supply the reservoir to its capacity and greater than the time taken to measure the pressure of the at least one tire.

4. The air supply system as claimed in claim 1 wherein air is discharged from the reservoir when a second predetermined reservoir pressure is reached, said second predetermined reservoir pressure being less than the first predetermined pressure.

5. The air supply system as claimed in claim 1 wherein air is discharged from the reservoir when a tire pressure measurement of the at least one tire is complete.

6. The air supply system as claimed in claim 1 wherein the consumer is a tire on the vehicle.

7. The air supply system as claimed in claim 6 wherein after the pressure of one tire is measured, air is discharged from the reservoir to a second tire.

8. The air supply system as claimed in claim 6, wherein a pressure measurement of a first tire is made and air is then discharged from the reservoir to the first tire or a second tire.

9. The air supply system as claimed in claim 1 wherein air is discharged from the reservoir to a further consumer on a vehicle not being a tire.

10. The air supply system as claimed in claim 1 wherein air is discharged from the reservoir to the atmosphere.

\* \* \* \* \*